US005564213A

United States Patent [19]
Rinehart

[11] Patent Number: 5,564,213
[45] Date of Patent: * Oct. 15, 1996

[54] FOLD-UP ICE FISHING RIG

[75] Inventor: John R. Rinehart, Milton, Wis.

[73] Assignee: American Institute of Taxidermy, Inc., Janesville, Wis.

[*] Notice: The portion of the term of this patent subsequent to Dec. 7, 2012, has been disclaimed.

[21] Appl. No.: 235,559

[22] Filed: Apr. 28, 1994

[51] Int. Cl.$^6$ .................................................. A01K 85/01
[52] U.S. Cl. ................................................................ 43/17
[58] Field of Search ...................................... 43/17, 15, 16

[56] References Cited

U.S. PATENT DOCUMENTS

| | | | |
|---|---|---|---|
| 2,636,303 | 4/1953 | Feigley | 43/17 |
| 3,641,693 | 2/1972 | Pinnow . | |
| 3,762,592 | 10/1973 | Mayes | 43/26 |
| 4,285,154 | 8/1981 | Grahl . | |
| 4,373,287 | 2/1983 | Grahl . | |
| 4,727,673 | 3/1988 | Dumar | 43/17 |
| 4,787,166 | 11/1988 | Vogt et al. . | |
| 5,044,108 | 9/1991 | Rinehart . | |
| 5,067,269 | 11/1991 | Eppley | 43/17 |
| 5,097,618 | 3/1992 | Stoffel | 43/17 |
| 5,157,855 | 10/1992 | Schmidt | 43/17 |
| 5,228,227 | 7/1993 | Hodgson | 43/15 |
| 5,235,773 | 8/1993 | Rinehart . | |

Primary Examiner—Joseph J. Hail, III
Assistant Examiner—James Miner
Attorney, Agent, or Firm—Foley & Lardner

[57] ABSTRACT

An ice fishing rig has a rigid elongated central housing to span a hole in the ice and lateral side edges to which fold-up panels are attached. The panels, which are preferably flexible, can be folded from a position in which they extend laterally outwardly from the central housing to a position where they are folded up underneath the central housing to form a compact unit for transportation and storage. When the rig is to be used, the side panels are folded out to their laterally extending position, and a spool assembly is rotated from a position in which it is aligned with and covered by the central housing to a position in which is perpendicular to the central housing. The rigid central housing spans the hole in the ice to support the rig while the laterally extending panels cover the hole to help inhibit freezing of the hole and to block sunlight from entering the hole. In addition, the central housing and side panels may be formed of a dark material to absorb heat from sunlight and further inhibit freezing of the water in the hole.

24 Claims, 4 Drawing Sheets

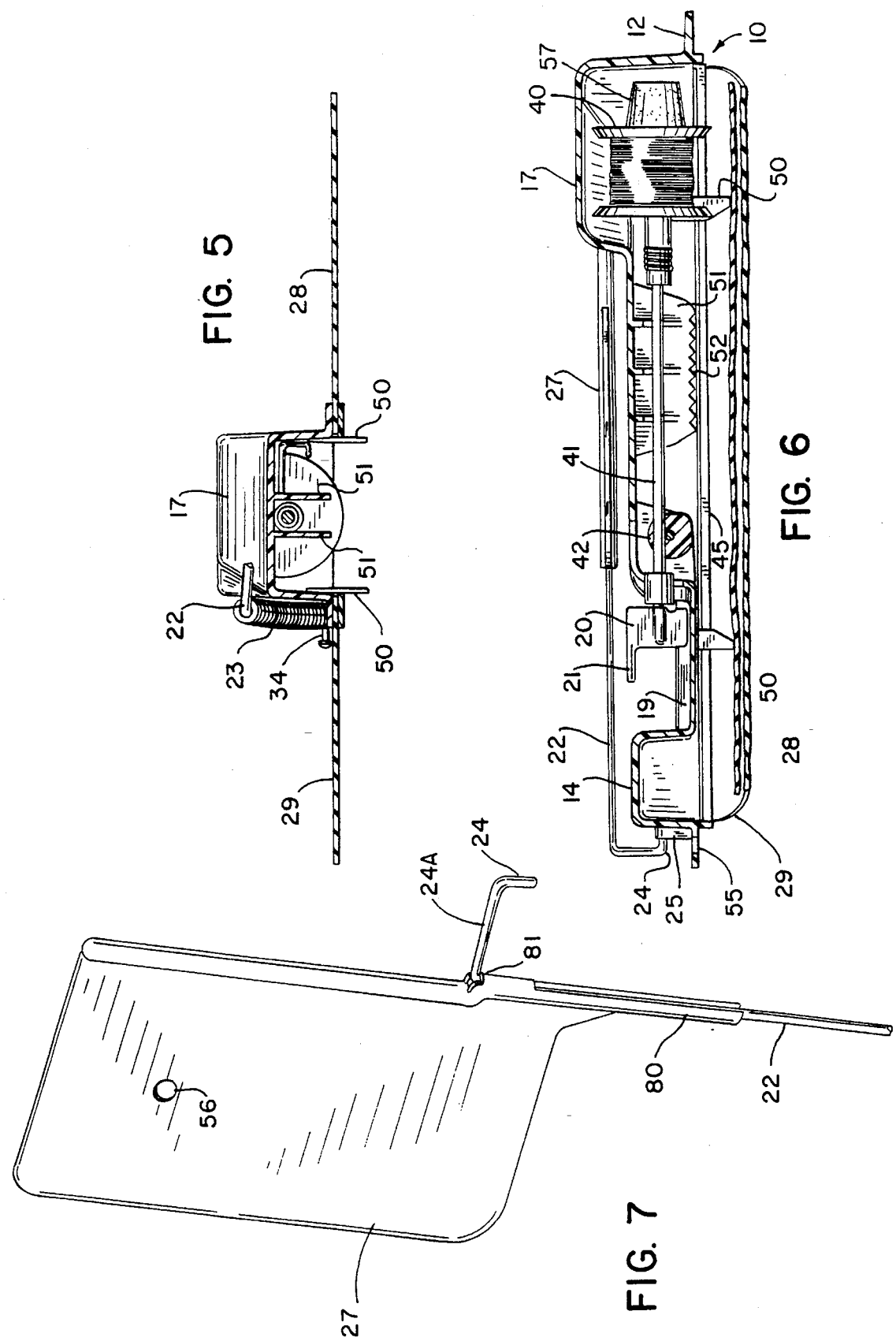

FOLD-UP ICE FISHING RIG

FIELD OF THE INVENTION

This invention pertains generally to the field of fishing equipment and particularly to "tip-up" rigs used in ice fishing.

BACKGROUND OF THE INVENTION

Ice fishing rigs are devices which mount above a hole in the ice and which typically have a reel with fishing line connected to it which actuates a signaling device, such as a spring mounted flag, to indicate to the fisherman when a fish has been hooked. Ice fishing rigs which have a spring mounted flag are often referred to as "tip-ups", and are the most common type of ice fishing rig. Many different designs have been developed for ice fishing tip-ups. A typical tip-up has a board or frame which spans the hole in the ice and supports the reel which extends down into the hole. The fisherman can leave such tip-up rigs untended for substantial periods of time, and can have several tip-ups located at holes in the ice at several different locations.

One problem often encountered when using tip-ups is that the water in the hole that is spanned by the tip-up tends to freeze up over time, possibly locking up the reel or at least interfering with its operation. The fisherman may thus have to periodically check the holes in the ice under the tip-ups and chip away any ice that has formed in the hole. One type of tip-up which addresses this problem, shown in U.S. Pat. No. 5,044,108 to Rinehart, has a body in the form of a buoyant circular disk of plastic which has a sufficient diameter to span a typical ice fishing hole. Another device, shown in U.S. Pat. No. 5,235,773 to Rinehart, has a central housing which spans the hole in the ice and rigid lids hingedly connected to the center portion of the housing which are folded together during transportation and storage, and which are folded out to cover the hole in the ice when in use.

SUMMARY OF THE INVENTION

In accordance with the present invention, an ice fishing rig has a rigid elongated central housing, having a longitudinal dimension which spans the hole in the ice and a width which is generally narrower than a typical hole, and two preferably flexible panels attached to the lateral side edges of the rigid housing. The panels fold out from a position in which they are folded up against the rigid central housing, forming a compact unit for transportation or storage, to a position wherein they extend laterally outwardly from the rigid housing to thereby completely cover the hole in the ice. The panels are preferably formed of a flexible, resilient material, such as synthetic rubber, and both the housing and the panels are preferably black or a dark color to maximize absorption of heat energy from sunlight. In accordance with the invention, it is found that the flexible panels cover and seal up the hole in the ice to inhibit the hole from freezing, and by absorbing heat from sunlight, further help to maintain the hole free of ice. In addition, the dark panels and the central housing serve to prevent light from entering the hole, thus making the rig and hole inconspicuous to fish.

In a preferred embodiment, the ice fishing rig of the present invention includes a signaling device, such as a rigid plastic flag mounted to a flag pole which is itself spring mounted to the central housing. The flag pole preferably has a hook with an outwardly extending portion at its top end, and the flag preferably includes a collar which engages the flag pole. The top end of the collar may have a notch on the outer end thereof which is adapted to engage the outwardly extending portion of the hook to hold the flag in a desired orientation on the flag pole. A foldable spool reel assembly, having a shaft with a spool reel at one end below the central housing and a reel handle at the other end above the central housing, is pivotally mounted to the housing to rotate from a concealed position, in which the spool reel rests within an enclosing portion of the housing and the reel handle is flush with the housing, to an operating position in which the shaft is perpendicular to the longitudinal dimension of the central housing. In this operating position, the flag pole can be pulled down by rotating it around its spring mounting and engaging it under the reel handle. The action of a fish hooked on a line connected to the reel will cause the handle to rotate and disengage the spring loaded flag pole, causing it to spring up to alert the fisherman that a fish has been caught. A line guide is preferably mounted to the spool shaft between the spool and a rubber collar. The rubber collar can be pushed down the spool shaft against the line guide to help hold it in place to inhibit live bait (e.g., a minnow) from drawing the line off of the line guide. Parallel ice breaking plates, having serrated top edges, extend from the inner bottom portion of the central housing on each side of the shaft when it is in its folded position in which the reel is concealed in the housing. These plates help to remove ice from the reel shaft as it is rotated to its storage position in the housing.

The central housing also preferably includes projecting feet which extend downwardly from the bottom of the central housing at positions spaced on either side of the reel shaft when it is in its operative position. The depending feet, preferably having substantially pointed ends, may extend down into the hole and will engage the walls of the hole if the housing is shifted (e.g., by the action of a fish pulling on the line connected to the reel), and will also tend to dig into the surface of the ice to inhibit movement, thus helping to prevent the rig from being dislodged wherein one end of the rig might fall into the hole in the ice. Consequently, the longitudinal dimension of the rigid central housing need only be long enough to span the diameter of typical ice fishing holes (which are usually 10 inches in diameter or less), to provide a conveniently sized unit for transportation and storage.

Further objects, features and advantages of the invention will be apparent from the following detailed description when taken in conjunction with the accompanying drawings.

BRIEF DESCRIPTION OF THE DRAWINGS

In the drawings:

FIG. 5 is a cross-sectional view of the ice fishing rig taken generally along the lines 5—5 of FIG. 3.

FIG. 6 is a cross-sectional view of the ice fishing rig in its folded configuration for transportation and storage, taken generally along the lines 6—6 of FIG. 1.

FIG. 7 is an illustrative perspective view showing the engagement between the flag and the flag pole of the ice fishing rig.

DETAILED DESCRIPTION OF THE INVENTION

Figure 1:
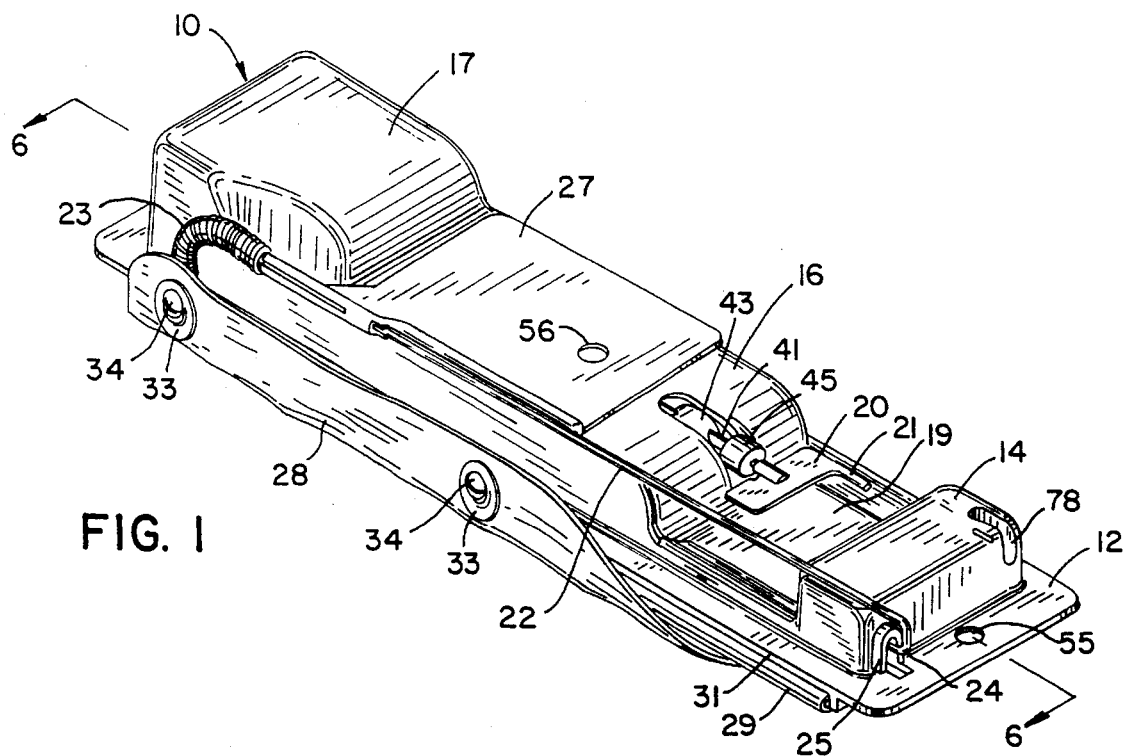
FIG. 1 is a perspective view of the ice fishing rig of the present invention shown in its folded position adapted for transportation and storage.

With reference to the drawings, an ice fishing rig in accordance with the present invention is shown generally at 10 in FIG. 1 in its folded form in which it is prepared for transportation or storage. The ice fishing rig of the present invention is particularly compact when in its folded form so that it can be easily transported in bulk to retail outlets and conveniently displayed on shelves for sale without taking up undue amounts of shelf space, and is small enough and light enough so that a fisherman can easily carry several of the ice fishing rigs 10 to a remote fishing location. The rig 10 has an elongated, rigid central housing 11 which is preferably formed of molded plastic, e.g., high density polycarbonate. The elongated central housing 11 has a substantially flat bottom panel 12 with raised enclosure sections 14, 16 and 17 formed integrally therewith and extending upwardly therefrom. A recessed section 19 of the housing between the raised sections 14 and 16 accommodates a reel handle 20 when the rig is in its folded compact position. The handle 20 has an upwardly extending rod portion 21 which can be held to conveniently turn the handle. In the folded position shown in FIG. 1, a flag pole 22, mounted to the main housing by a spring 23, has a hooked end 24 which is engaged in a retaining slot 25 formed toward the top end of the raised section 14 of the housing. A rigid plastic flag 27 is mounted on the flagpole 22. Two flexible side panels 28 and 29 are attached to the lateral side edges 30 and 31, respectively, of the central housing. In FIG. 1, the side panel 29 is shown tucked inwardly over the bottom of the central housing, and the side panel 28 is shown folded up over the panel 29. Grommets 33 in the panel 28 define openings which are engaged over posts 34 which extend laterally from the central housing, thereby holding the panels 28 and 29 in place on the central housing. The rigid plastic flag 27 is shown in its folded compact position in FIG. 1, pulled down to a midway position on the flag pole 22 and turned so it lays flat against or near the top surface of the raised section 16 of the central housing.

Figure 2:
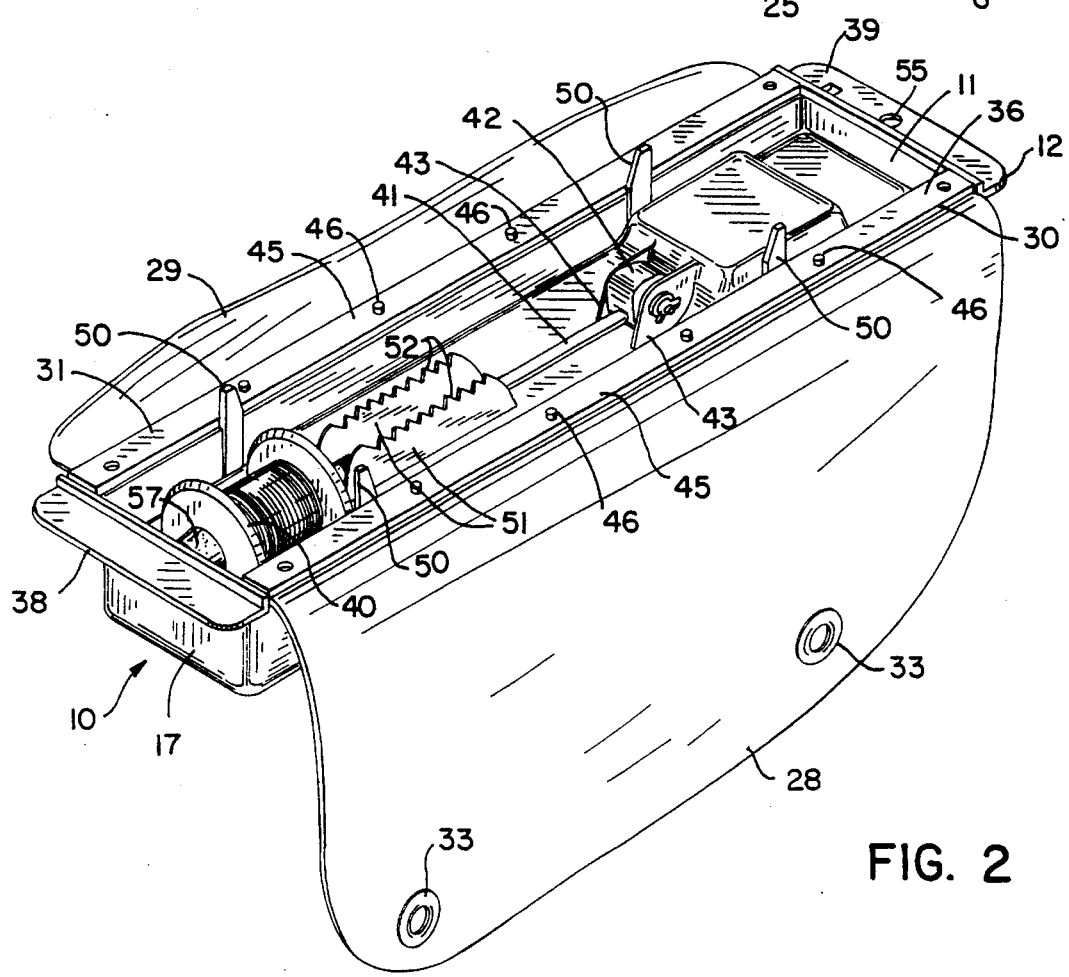
FIG. 2 is a perspective view looking at the bottom of the ice fishing rig of the invention, with the side panels opened and with the spool and shaft shown in their retracted position for storage and transportation.

The rig 10 is shown in a bottom view in FIG. 2 in which the side panels 28 and 29 have been folded open to expose the inside of the bottom of the central housing 11. As illustrated in FIG. 2, the bottom surface 36 of the housing is substantially flat and is bounded by a rectangular periphery, with the lateral side edges 30 and 31, which extend in the longitudinal direction of the rig, being substantially longer than the top and bottom end edges 38 and 39 which define the width of the central housing. For example, a typical longitudinal dimension between the edges 38 and 39, adequate to span typical ice fishing holes, is about 14 inches, and the dimension of the end edges 38 and 39 may be in the range of 3½ inches. As illustrated in FIG. 2, when the ice fishing rig 10 is in its compact position, a spool 40 forming part of a spool assembly is enclosed within a cavity defined in the underside of the raised section 17. The spool 40 is mounted on a spool outer shaft 41 of the spool assembly, and the shaft extends through a swivel mount 42 which is mounted for pivoting to mounting members 43 which are preferably integrally molded with the rest of the central housing. The main shaft 41 is connected to a bearing 45 from which extends an inner shaft to which the reel handle 20 is mounted. The inner shaft (not shown) is firmly connected to the spool 40 so that the spool 40 rotates with the reel handle 20.

The side panels 28 and 29 are attached to the central housing so that they can be folded up to cover the bottom of the housing and form a compact unit for transportation and storage. The panels 28 and 29 may be rigid panels connected by hinges to the lateral edges of the central housing to fold up onto the central housing, for example, as shown in U.S. Pat. No. 5,235,773, issued Aug. 17, 1993 to the present inventor, the disclosure of which is incorporated herein by reference. Preferably the panels 28 and 29 are formed of a flexible and somewhat resilient material, such as neoprene rubber, so that the panels can be folded up by flexing the panels into a folded position covering the bottom of the central housing. The flexible panels 28 and 29 may be attached to the lateral edges of the central housing in various manners. A preferred connection is shown in FIG. 2, in which elongated plastic strips 45 are secured to pegs 46 which are molded into and extend up from the central housing through corresponding holes (not shown) in the flexible panels 28 and 29, with a portion of the panels 28 and 29 being secured between the strips.45 and the underlying body of the central housing.

As also illustrated in FIG. 2, protruding feet 50 extend downwardly from the bottom of the central housing 11 (preferably being integrally formed with the housing) at positions spaced on either side of the spool shaft 41 when it is in its operative position extending downwardly from the central housing. The protruding feet 50 extend a short distance beyond the bottom surface 36 of the central housing (e.g., ⅜ inch) and help to hold the rig in position over the hole in the ice, as discussed further below. The protruding feet preferably have substantially pointed ends as shown. Two plates 51 having serrated top edges 52 preferably extend from the inner surface of the middle section 16 of the central housing. The plates 51 are positioned closely adjacent to the position of the shaft 41 when it is rotated to its inwardly folded position shown in FIG. 2. The plates 51, aided by the serrations 52 on the top of the plates, serve to dislodge ice that may have accumulated about the shaft 41 after the rig has been in use and is now being folded up to be transported.

To facilitate storage of the folded rig 10, a hole 55 is preferably formed in the flat base panel 12 at a position near one end which allows a nail, hook, etc. to be passed through the hole to hang the rig on a wall when it is not in use. The flag 27 may also be provided with a central hole 56 to facilitate mounting of a small night light (not shown) to the flag 27 to facilitate detection of an upraised flag during night fishing. A small cork 57 may be mounted to the bottom of the spool 40 as shown in FIGS. 2, 4 and 6 to provide a convenient place for a hook to be engaged when the rig is being folded up for storage.

As best shown in the cross-sectional view of FIG. 6, when the rig 10 is in its compacted position, the spool 40 is substantially contained within the cavity defined by the upraised section 17, while the spool shaft 41 is contained within the uppraised section 16 of the central housing. The shaft 41 lies in a position substantially parallel to the longitudinal dimension of the central housing, with the reel handle 20 lying within the depression 19 formed between the raised sections 14 and 16. The flexible panels 28 and 29 are closed over the bottom of the central housing and, because they are flexible, can be deformed around the protruding feet 50. The hook 24 of the flag pole 22 is engaged within the slot 25 formed on a vertical wall of the upraised portion 14. Because the flag pole 22 can be drawn longitudinally by pulling on the flag pole to extend the spring 23, the hook 24 of the flag pole will be held within the slot 25 by the action of the spring to retain it in that position until the fisherman wishes to release it. Although the raised section 14 has been shown as enclosing only a cavity in FIG. 6, a flotation device (not shown) such as cork, or other floats, could be mounted within the cavity formed by the section 14, and such flotation devices can also be mounted in the section 16, if desired, adjacent the plates 51.

Figure 3:
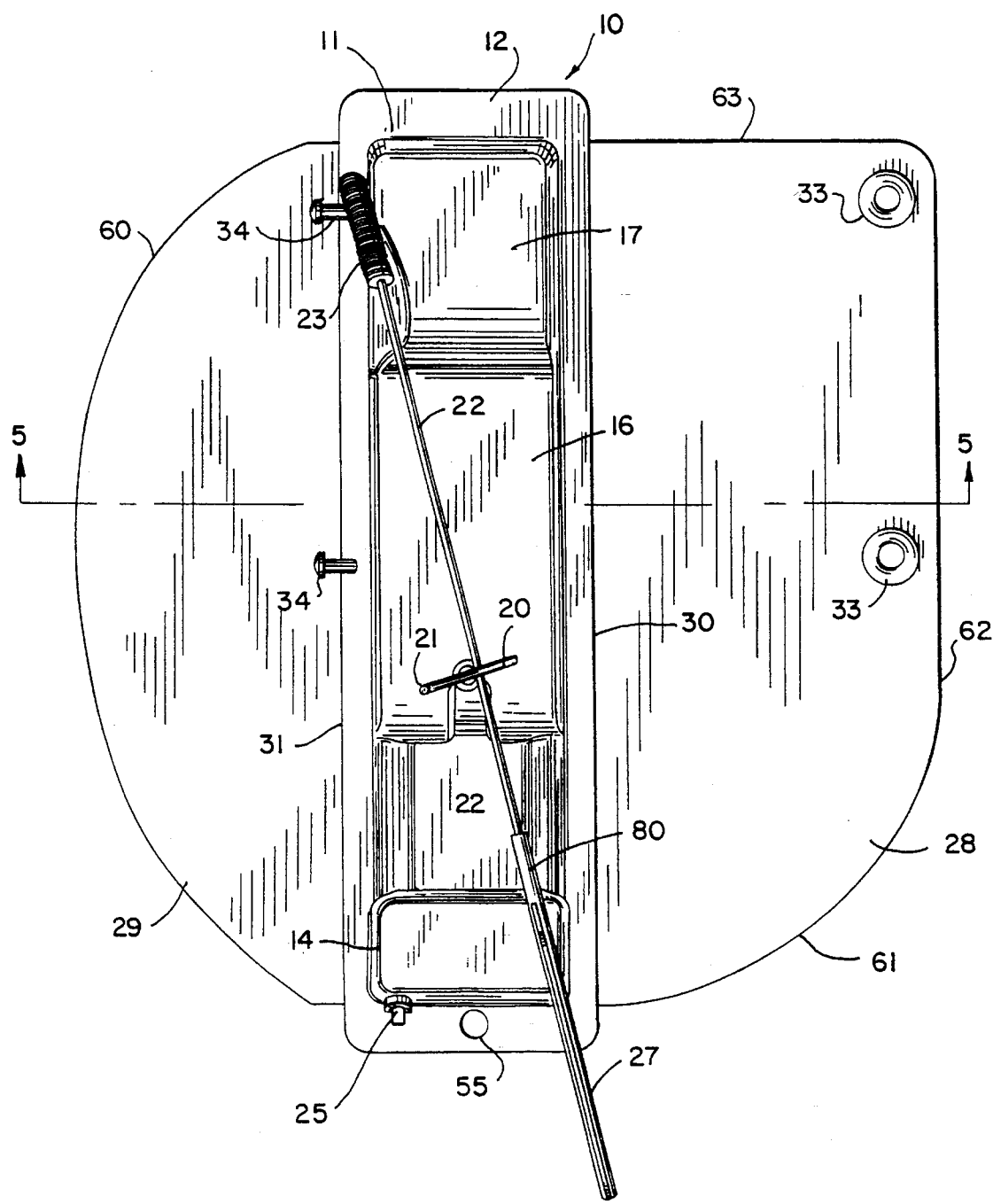
FIG. 3 is a top view of the ice fishing rig shown in its operative position with the side panels extended and with the flag pole engaged under the reel handle.

When the rig 10 is to be put in place over an ice fishing hole by a fisherman, the fisherman pulls the flexible panel 28 off the posts 34 and opens the panels 28 and 29 up as shown in FIG. 2. As illustrated in the top view of FIG. 3, showing the panels 28 and 29 spread out, the panel 29 has a semi-circular periphery 60 whereas the panel 28 preferably has a partially circular periphery portion 61, a straight portion 62 adjacent the grommets 33, and another straight portion 63 which extends back to connection to the central housing. The panel 29 is preferably somewhat smaller than the panel 28 so that the panel 29 can be folded in first, and the panel 28 can extend over the bottom of the central housing so that the grommet holes 33 can be engaged to the posts 34. The diagonal distance between the periphery 60 of the panel 29 and the periphery portions 61 and 62 of the panel 28 is preferable wide enough so as to completely span beyond the normal ice fishing hole. For example, for a hole up to 10 inches in diameter, the distance between the peripheries of the panels 28 and 29 would preferably be at least 12 inches, and generally 13 to 14 inches. In this manner, the panels 28 and 29, together with the central housing 11, completely cover the ice fishing hole to insulate the hole and inhibit freezing of the water in the hole. The flexibility of the panels 28 and 29 is particularly desirable inasmuch as the panels will tend to rest on the ice and conform to the surface of the ice, providing a relatively good seal to the ice to limit the exposure of the ice in the hole to ambient air, particularly winds, which could tend to quickly cool the water in the hole below its freezing point. If desired, the fisherman can pack snow or ice around the edges of the panels to further seal the hole. In addition, the panels 28 and 29 are preferably dark (e.g., black) and absorb heat energy from sunlight, with the warmth therefrom helping to keep the water in the hole liquid. The central housing 11 is also preferably formed of a dark (e.g., black) plastic to help absorb heat from sunlight.

Figure 4:
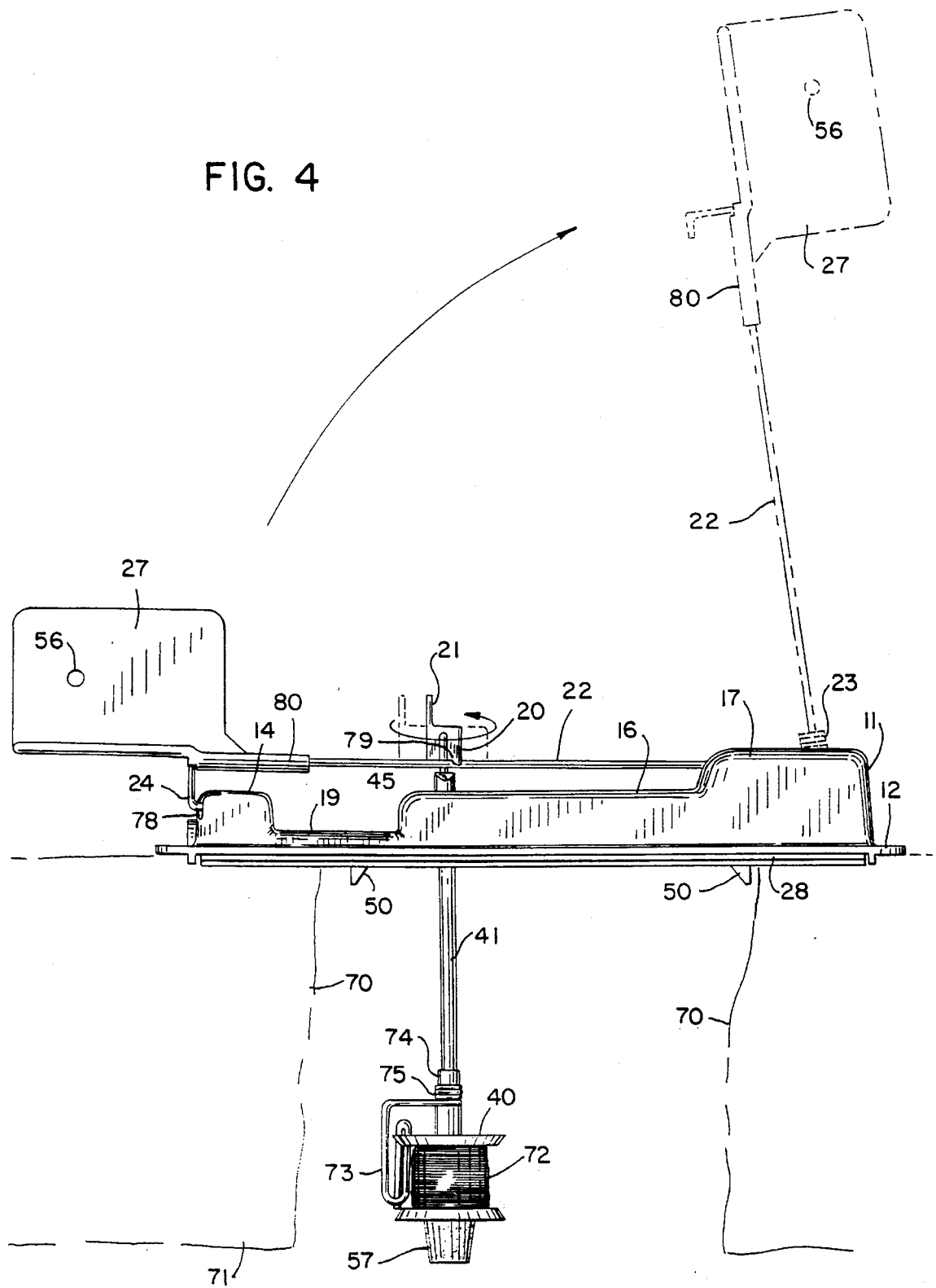
FIG. 4 is a side view of the ice fishing rig of the invention mounted above a hole in the ice, illustrating the manner in which the flag pole is engaged under the reel handle and disengaged when a fish has been hooked.

The ice fishing rig 10 of the invention is illustratively shown in position spanning the sidewalls 70 of a hole in ice 71 in FIG. 4. The spool shaft 41 is in its vertical position at this point, perpendicular to the longitudinal dimension of the central housing 11. The fishing line 72 wound on the spool 40 is passed through a line guide 73 formed of stiff metal wire which is connected around the central shaft 41 at a top end 75 which winds around the shaft. A collar 74 mounted about the shaft 41 can be frictionally engaged against the top end 75 of the line guide 73 to help hold the line guide in a fixed position on the shaft 41. The collar 74 is formed of a resilient material, e.g., rubber. The collar 74 has a hollow bore so that it can slide on the shaft 41, but the bore of the collar is sized so it engages the shaft fairly tightly. The engagement of the collar 74 to the line guide inhibits the guide from freely rotating about the shaft and helps prevent live bait (e.g., minnows) from dislodging the line from the line guide. As illustrated in FIG. 4, the fisherman arms the fishing rig 10 by pulling the flag pole 22 downwardly, bending the spring 23 until the hook end 24 of the flag pole rests within a groove 78 formed in the upraised section 14. The groove 78 is wide enough so that it does not interfere with the movement of the flag pole. The reel handle 20 is then rotated until a notch 79 formed in the bottom of the handle 20 is engaged over the flag pole 22 to hold it in place. When a fish is caught, it pulls on the line, rotating the spool 40 and the handle 20 connected to it, disengaging the flag pole 22 from the handle and allowing the flag pole to rise up to the upright position illustratively shown in FIG. 4.

The spring mounted flag described above is a conventional signaling device in "tip-up" type fishing rigs. However, any other type of signaling means operatively connected to the spool reel assembly may similarly be used. These include, for example only, electrically activated devices wherein a switch is closed when the spool reel is disturbed by the action of a fish to turn on a light or an audible alarm. Any type of signaling device may be used, whether mechanically or electrically actuated, to signal when a fish has been caught.

As best illustrated in FIG. 4, four protruding feet 50 extend downwardly from the lateral edges of the bottom surface of the central housing and are preferably spaced inwardly from the side 70 of the hole in the ice. Thus, if the rig is displaced longitudinally, two of the protruding feet 50 will be brought into engagement with the side 70 of the hole, helping to prevent the rig from being displaced from its desired position spanning the hole. Even where the rig is used with a smaller hole, the feet 50 may rest on the top surface of the ice and provide a claw-type action to engage the ice to inhibit the rig from being displaced.

The flag 27 is preferably formed of a relatively rigid plastic which has a collar section 80 adapted to tightly engage but slide on the flag pole 22 so that the flag 27 can be moved downwardly to a lower position on the flag pole, as illustrated in FIG. 1, when the tip-up is to be transported or stored. When the tip-up is to be used, the flag 27 is pulled upwardly on the flag pole 22. Preferably, the collar 80 has a notch 81 formed at its top end facing away from the flag 27 which is adapted to engage an outwardly extending section 24a of the hook 24, as best illustrated in FIG. 7. When the outwardly extending section 24a is engaged in the notch 81, the flag 27 is restrained from rotating on the flag pole 22 and can be held in a desired orientation which is preferably parallel to the longitudinal direction of the central housing 11. The collar 80 may be split as shown in FIG. 7 to facilitate its sliding on the flag pole 22.

It will be apparent to those of ordinary skill that various alternative constructions and materials may be used without departing from the present invention. For example, many other materials may be used for the rig, including metal, other types of plastics, rubber, etc. The flexible panels 28 and 29 may also be formed of materials other than rubber. For example, the panels 28 and 29 may be formed of a molded flexible plastic, and, if so, the grommets 33 may be formed as thicker reinforced portions of the flexible plastic forming the panels. In appropriate cases, the panels 28 and 29 and the central housing 11 may be integrally formed of the same material. For example, the panels may be formed thinner than the walls of the central housing so that the panels are flexible whereas the central housing is not, or the panels may be of the same thickness as the central housing, with the central housing being rigidified by virtue of the upraised sections 14, 16 and 17 and the depression 19 or by other reinforcing structure.

It is thus understood that the invention is not confined to the particular construction or arrangement of parts illustrated herein, but embraces all such modified forms thereof as come within the scope of the following claims.

What is claimed is:

1. An ice fishing rig comprising:
   (a) a rigid central housing having a longitudinal dimension for spanning a hole in the ice, a bottom which can rest on the ice, and opposite lateral side edges extending in the longitudinal direction;
   (b) two side panels foldably attached to the opposite lateral side edges of the central housing, the side panels foldable from a position extending laterally outwardly from the central housing to a position wherein the panels are folded up to cover the bottom of the central housing thereby forming a compact unit for transportation or storage; and
   (c) a spool assembly including a spool mounted to the central housing, and signaling means on the central housing operatively connected to the spool assembly for signaling when a fish has been caught and the spool assembly is disturbed by the fish.

2. The ice fishing rig of claim 1 wherein the side panels are both formed of a flexible material and the side panels are attached to the central housing and fold up by flexing to cover the bottom of the central housing.

3. The ice fishing rig of claim 2 wherein the side panels are formed of flexible rubber.

4. The ice fishing rig of claim 1 wherein the central housing and the side panels are formed of a dark material to absorb heat from sunlight.

5. The ice fishing rig of claim 1 including protruding feet extending downwardly from the bottom of the central housing spaced on either side of the position at which the spool assembly is mounted to the central housing, to engage the ice at a hole to inhibit shifting of the rig with respect to the hole.

6. The ice fishing rig of claim 1 wherein the signaling means comprises a flag attached to a flag pole which is mounted by a spring to the central housing, the spool assembly having a reel handle on the opposite end of the shaft from the spool with the handle connected to the spool to rotate therewith, the flag pole engagable under the handle to be held in a downward position and to be released when a fish is caught and rotates the spool to rotate the handle and free the flag to rotate upward under the action of the spring.

7. The ice fishing rig of claim 6 wherein the flag is formed of a plastic material which includes a collar which engages the flag pole, the flag extending from the collar, the top end of the collar having a notch formed therein, the flag pole having a hook at its end with an outwardly extending section, the notch in the collar adapted to engage the outwardly extending section of the hook to hold the flag in a desired orientation on the flag pole.

8. The ice fishing rig of claim 6 wherein the reel handle has an upwardly extending rod portion at an outer end of the handle which can be grasped by a fisherman to readily rotate the handle.

9. The ice fishing rig of claim 6 wherein the flag is formed of rigid plastic and has a hole in it for mounting a night light.

10. The ice fishing rig of claim 6 wherein the spool assembly has a shaft which is mounted for pivoting to the central housing to pivot from a position extending downwardly in a direction perpendicular to the longitudinal direction of the central housing to a position in which the shaft is parallel to the longitudinal direction of the central housing, and wherein the central housing includes two plates extending downwardly from the inner surface of the central housing spaced on opposite sides of the shaft when the shaft is in its position parallel to the central housing, the plates having serrated outer edges to help dislodge ice built up around the shaft when it is retracted to its position parallel to the longitudinal direction of the central housing.

11. The ice fishing rig of claim 1 wherein the side panels are formed of a flexible material connected to the lateral side edges of the central housing, and wherein one of the panels is wider than the other so that the narrower panel can be folded in first and the longer panel can be folded over it, including posts extending laterally from one of the side edges of the central housing and corresponding openings near the outer edges of the longer side panel with the posts adapted to fit through the holes to secure the side panel to the central housing.

12. The ice fishing rig of claim 1 including a line guide mounted to the spool assembly shaft at an upper end of the line guide at a position above the spool, and a resilient collar mounted about the spool assembly shaft in position to frictionally engage the line guide upper end to help hold it in a desired position on the shaft.

13. The ice fishing rig of claim 1 wherein the central housing is integrally formed of molded plastic and includes upraised sections thereof defining cavities thereunder, the spool assembly including a spool which is adapted to be retracted to a position wherein it fits within the cavity of an upraised section of the central housing.

14. An ice fishing rig comprising:
   (a) a rigid central housing having a longitudinal dimension for spanning a hole in the ice, a bottom which can rest on the ice, and opposite lateral side edges extending in the longitudinal direction;
   (b) two flexible side panels attached to the opposite lateral side edges of the rigid central housing, the flexible panels being foldable from a position extending laterally outwardly from the central housing to a position wherein the flexible panels are folded up over each other and cover the bottom of the central housing thereby forming a compact unit for transportation or storage; and
   (c) a spool assembly including a spool mounted to the central housing, and signaling means on the central housing operatively connected to the spool assembly for signaling when a fish has been caught and the spool assembly is disturbed by the fish.

15. The ice fishing rig of claim 14 wherein the side panels are formed of flexible rubber.

16. The ice fishing rig of claim 14 wherein the central housing and the side panels are formed of a dark material to absorb heat from sunlight.

17. The ice fishing rig of claim 14 including protruding feet extending downwardly from the bottom of the central housing spaced on either side of the position at which the spool assembly is mounted to the central housing, to engage the ice at a hole to inhibit shifting of the rig with respect to the hole.

18. The ice fishing rig of claim 14 wherein the signaling means comprises a flag attached to a flag pole which is mounted by a spring to the central housing, the spool assembly having a reel handle on the opposite end of the shaft from the spool with the handle connected to the spool to rotate therewith, the flag pole engagable under the handle to be held in a downward position and to be released when a fish is caught and rotates the spool to rotate the handle and free the flag to rotate upward under the action of the spring.

19. The ice fishing rig of claim 14 wherein the flag is formed of a plastic material which includes a collar which engages the flag pole, the flag extending from the collar, the top end of the collar having a notch, the flag pole having a hook at its end with an outwardly extending section, the notch in the collar adapted to engage the outwardly extending section of the hook to hold the flag in a desired orientation on the flag pole.

20. The ice fishing rig of claim 14 wherein the reel handle has an upwardly extending rod portion at an outer end of the handle which can be grasped by a fisherman to readily rotate the handle.

21. The ice fishing rig of claim 14 wherein one of the side panels is wider than the other so that the narrower panel can be folded in first and the longer panel can be folded over it, including posts extending laterally from one of the side edges of the central housing and corresponding openings near the outer edges of the longer side panel with the posts adapted to fit through the holes to secure the side panel to the central housing.

22. The ice fishing rig of claim 14 wherein the spool assembly has a shaft which is mounted for pivoting to the central housing to pivot from a position extending downwardly in a direction perpendicular to the longitudinal direction of the central housing to a position on which the shaft is parallel to the longitudinal direction of the central housing, and wherein the central housing includes two plates extending downwardly from the inner surface of the central housing spaced on opposite sides of the shaft when the shaft is in its position parallel to the central housing, the plates having serrated outer edges to help dislodge ice built up around the shaft when it is retracted to its position parallel to the longitudinal direction of the central housing.

23. The ice fishing rig of claim 14 wherein the central housing is integrally formed of molded plastic and includes upraised sections thereof defining cavities thereunder, the spool assembly including a spool which is adapted to be retracted to a position wherein it fits within the cavity of an upraised section of the central housing.

24. A fishing rig comprising:

(a) a rigid central housing having a longitudinal dimension;

(b) a spool assembly mounted to the central housing and including a spool shaft mounted to the central housing, a spool mounted to one end of the spool shaft beneath the central housing and a reel handle mounted to the top end of the spool shaft to rotate with the spool; and (c) a flag pole mounted by a spring to the central housing and a flag mounted to the flag pole, the flag pole being depressible about the spring to a lower position in which the flag pole can be engaged under the reel handle to be held down until a fish is caught which rotates the spool to rotate the spool handle and release the flag, wherein the flag is formed of a plastic material which includes a collar which engages the flag pole, the flag extending from the collar, the top end of the collar having a notch formed therein, the flag pole having a hook at its end with an outwardly extending section, the notch in the collar adapted to engage the outwardly extending section of the hook to hold the flag in a desired orientation on the flag pole.

* * * * *